United States Patent [19]

Markowitz

[11] 3,789,371

[45] Jan. 29, 1974

[54] MOSFET MEMORY CELL

[75] Inventor: Seymour Markowitz, Palos Verdes, Calif.

[73] Assignee: Lockheed Electronics Company, Inc., Plainfield, N.J.

[22] Filed: Nov. 20, 1972

[21] Appl. No.: 308,037

[52] U.S. Cl. .............. 340/173 R, 307/238, 307/239

[51] Int. Cl. ............................................ G11c 13/00

[58] Field of Search . 340/173 R; 307/238, 279, 239

[56] References Cited

UNITED STATES PATENTS 3,363,115 1/1968 Stephenson ..................... 340/173 R

*Primary Examiner*—Terrell W. Fears

*Attorney, Agent, or Firm*—Billy G. Corber; Albert K. Geer

[57] ABSTRACT

A MOSFET memory cell system wherein a plurality of one transistor per bit cells is combined with a three transistor switching circuit.

4 Claims, 2 Drawing Figures

MOSFET MEMORY CELL

Figure 1:
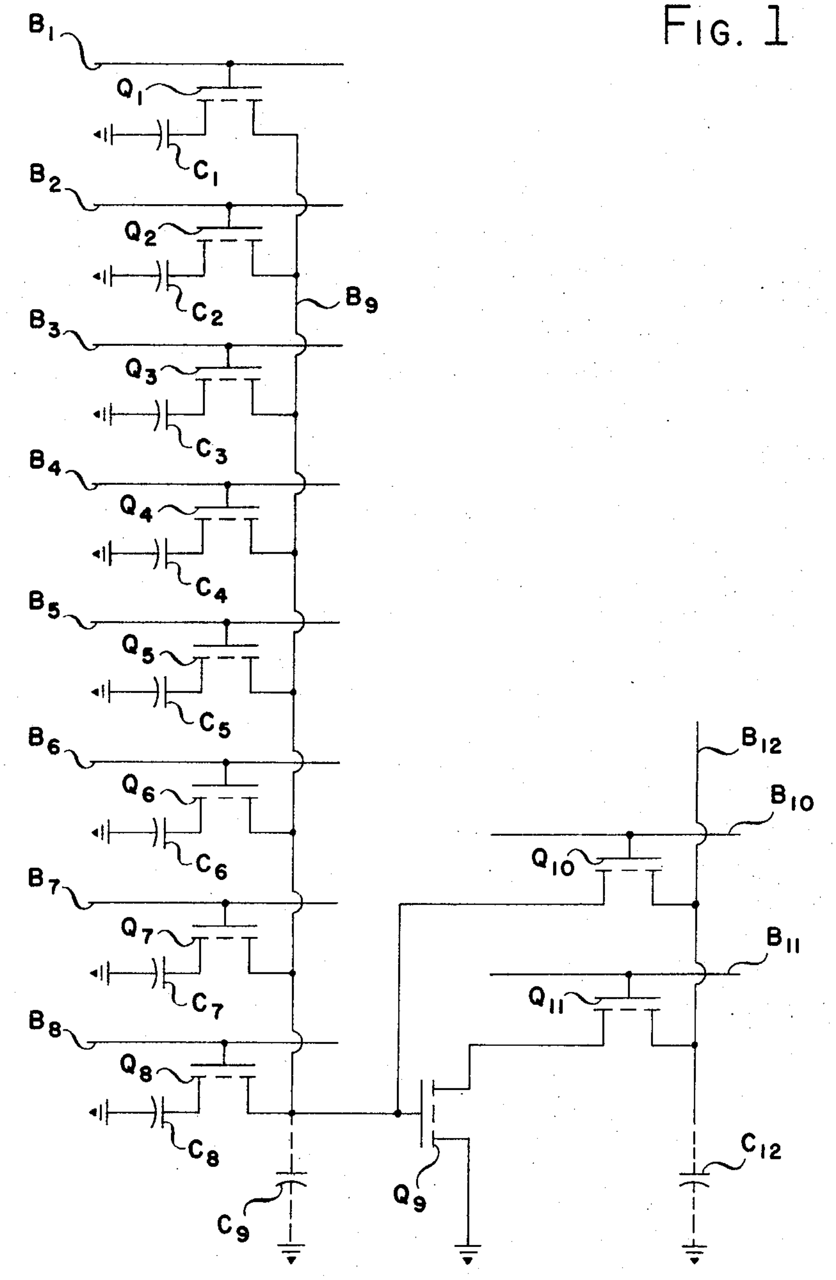

The present invention relates generally to memory systems and more particularly to metal oxide semiconductor random access memory cells (MOS RAM).

At the present time, semiconductor memory storage cells are generally of two configurations—a one transistor per bit or a three transistor per bit configuration. See an article by L. M. Terman, entitled "MOSFET Memory Circuits," Proceedings of the IEEE, Vol. 59, No. 7, July 1971, pages 1044–1058, and specifically page 1049.

A one transistor per bit MOS RAM contains an array of memory cells, each of which consists of one capacitor and one MOS transistor. The capacitor stores a bit of information in the form of electrical charge and voltage. The energized transistor connects a plate of the capacitor to an array bus ("data bus"), permitting charge to flow from one body to the other until their voltages are equal. In a write operation, the capacitor voltage adjusts itself to equal the fairly stable bus voltage which had been set according to the bit to be written into the memory cell. In a read operation, the capacitor is connected to the bit line through the transistor. Both voltages change by capacitive divider action. The final bus voltage that is sensed by the sense amplifier is a fraction of the initial capacitor voltage that represented the bit stored in the cell. The one transistor per bit MOS RAM can contain many cells per unit area because each cell, having only one transistor, is small. However, the readout is destructive and the writing speed is limited by the cell capacitor which must be made larger than minimum geometry in order that its capacitance be a sizable fraction of the data bus capacitance so that the sense amplifier can distinguish the final bus voltage when reading out a ONE from the final bus voltage when reading out a ZERO. As a result, the one transistor per bit MOS RAM usually ends up with a smaller cell and less distinguishable signals than the three transistor per bit MOS RAM.

A three transistor per bit MOS RAM contains an array of memory cells, each of which consists of one capacitor and three MOS transistors. The capacitor stores a bit of information in the form of electrical charge and voltage. One transistor when energized during a write operation, connects a plate of the capacitor to an array bus. The capacitor voltage then adjusts itself to equal the fairly stable bus voltage, which had been set according to the bit to be written into the memory cell. Another grounded source transistor amplifies, inverts and buffers the capacitor voltage which is supplied to its gate. In a read operation, its drain is connected by a third transistor to an array bus. (The latter may or may not be the same as the array bus involved in the write operation.) Then the capacitor voltage that represents the bit stored in the cell remains stable, while the array bus is shorted to ground or not, depending on that bit of information. Therefore, the sense amplifier can easily distinguish whether a ONE OR ZERO had been stored in the cell. The capacitor is usually minimum geometry, but even the three transistors is larger than the one transistor per bit cell. As a result, the three transistor per bit MOS RAM contains fewer cells per unit area.

Accordingly, a primary object of the invention is to improve metal oxide semiconductor random access memories in density and reliability.

Another object of the invention is to provide improved operation of memory information storage cells.

Figure 2:
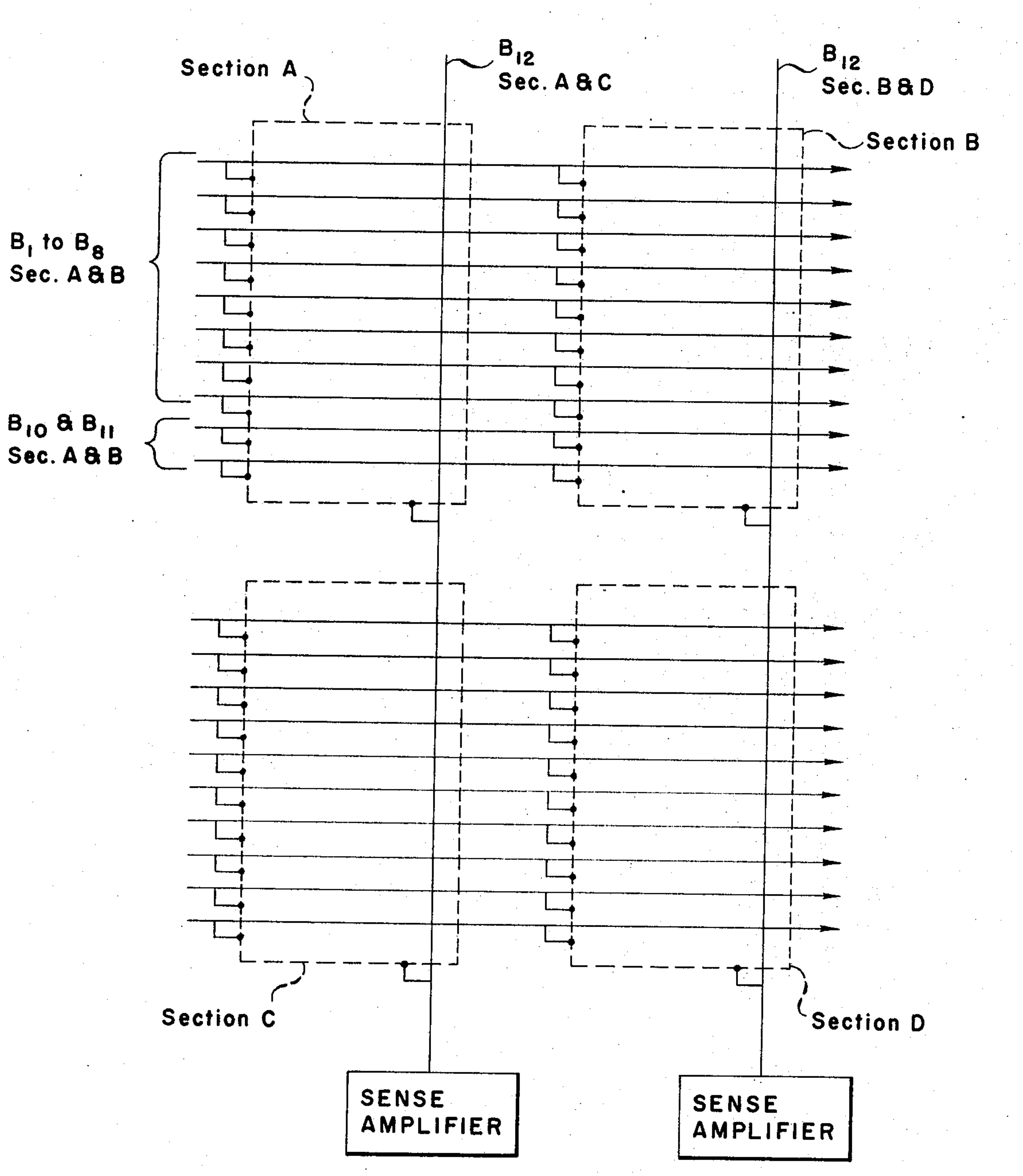

These and other objects will become apparent from the following description when taken with the accompanying drawings, in which:

FIG. 1 is a section of a memory array illustrating the preferred embodiment of the invention; and FIG. 2 is a block diagram showing a plurality of sections connected in an array.

Now with the reference to FIG. 1, a plurality of capacitor storage cells $C_1$ to $C_8$ are shown, and a plurality of gating devices $Q_1$ to $Q_8$ connect the respective cells to a bus bar $B_9$, which for convenience will be referred to as the intermediate data bus. Gating signal bus bars $B_1$ and $B_8$ are connected to the gates of the respective gating devices (MOS transistors). Transistor $Q_{10}$ connects the intermediate data bus to a main data bus $B_{12}$. The gate of $Q_{10}$ is connected to control signal bus $B_{10}$. Transistors $Q_9$ and $Q_{11}$ are connected between the main data bus and ground. The gate of $Q_{11}$ is connected to control signal bus $B_{11}$, and the gate of $Q_9$ is connected to the intermediate data bus $B_9$. It will be noted that to a one transistor per bit cell, the intermediate data bus acts like the data bus of a one transistor per bit MOS RAM. To a three transistor per bit cell, the intermediate data bus acts like the ungrounded capacitor plate of a three transistor MOS RAM cell. This is indicated by the stray capacitance $C_9$.

In a write operation that enters a bit into capacitor $C_1$, energized signal bus $B_{10}$ causes MOS transistor $Q_{10}$ to connect intermediate data bus $B_9$ to main data bus $B_{12}$. At the same time, energized bus $B_1$ causes MOS transistor $Q_1$ to connect bus $B_9$ to cell capacitor $C_1$. The capacitor voltage adjusts itself to equal the fairly stable voltage of $B_{12}$. That is, data to be written is transferred from the main bus $B_{12}$ to capacitor $C_1$ by way of transistor $Q_{10}$, intermediate data bus $B_9$ and transistor $Q_1$.

At the start of a read operation that senses the bit stored in capacitor $C_1$, the stray capacitance $C_9$ of the bus $B_9$ is charged to ground, so MOS amplifier transistor $Q_9$ is initially nonconducting. Main data bus $B_{12}$ is charged to a voltage other than ground. In the read operation, energized bus $B_{11}$ causes MOS transistor $Q_{11}$ to connect the $Q_9$ drain to $B_{12}$. At the same time, energized bus $B_1$ causes MOS transistor $Q_1$ to connect $B_9$ to $C_1$. If $C_1$ had been charged to ground, $C_9$ remains charged to ground, and $B_{12}$ remains at a voltage other than ground. If $C_1$ had been charged to a voltage V with respect to ground, charge flows between $C_1$ and $C_9$ until they are both at a voltage equal to $C_1V/(C_1+C_9)$. That voltage on $C_9$ is enough to cause $Q_9$ to conduct and connect $B_{12}$ to ground through $Q_{11}$. The sense amplifier (not shown) detects the voltage change of $B_{12}$.

FIG. 2 shows a 2 × 2 array of sections. Buses $B_1$–$B_8$, $B_{10}$ and $B_{11}$ extend through sections A, B, etc. in the word direction, and the sensed bits are read out on the main data buses 12, one bit per section. Bus 9 is internal in each section and is not shown in FIG. 2. Bus $B_{12}$ may be connected permanently through a MOS resistor to a voltage other than ground, or its capacitance $C_{12}$ may be charged before a read operation to a voltage other than ground.

While bus $B_{12}$ is used for both read and write, it is apparent that separate buses could be utilized. Furthermore, the number of cells communicating with each intermediate is not limited to eight.

The advantages of the invention should be readily apparent. Intermediate bus $B_9$ is much shorter than the data bus of a one transistor per bit MOS RAM. Therefore, $C_9$ is much less than the capacitance of the one transistor per bit data bus, and the ratio $C_1/(C_1 + C_9)$ is greater than the corresponding ratio for the one transistor per bit. Thus, for a given non-zero cell capacitor voltage, the present invention produces a larger read operation final voltage on $B_9$ than the one transistor per bit produces on its data bus. Cell capacitors $C_1$ through $C_8$ may be made larger than minimum geometry in order to increase $C_1/(C_1 + C_9)$, and yet the total space occupied by a section in accordance with this invention is much less than the space occupied by eight three transistors per bit cells.

The present invention thus achieves the easily detectible sense signals of the three transistor cell together with the high density of the one transistor cell.

What is claimed is:

1. A memory cell system comprising:

a. a plurality of memory cells, b. an intermediate data bus, c. a plurality of switching devices, each connecting a respective cell to the intermediate data bus, d. at least one main data bus, e. means for transferring data from the main data bus into one of said cells, f. means for energizing one of the switching devices to transfer data from a cell to the intermediate data bus, and g. means responsive to the data in the form of a voltage on the intermediate data bus for grounding the main data bus.

2. A memory cell system as defined in claim 1, wherein the grounding means comprises a pair of semiconductor devices having their drain to source paths series connected, with the gate of one device being connected to the intermediate data bus and the gate of the other device connected to an energizing control signal bus.

3. A memory cell system as defined by claim 1, wherein the data transferring means comprises a semiconductor device connecting the main data bus to the intermediate data bus and one of the switching devices, whereby when the switching device and the semiconductor device are energized, data on the main data bus is transferred to the cell.

4. A memory cell system as defined by claim 1, wherein the cell system is metal oxide semiconductor circuitry.

* * * * *